United States Patent
Iwazono et al.

(10) Patent No.: US 6,941,774 B2
(45) Date of Patent: Sep. 13, 2005

(54) OPTICAL FIBER PREFORM-HEATING FURNACE

(75) Inventors: Takehiko Iwazono, Takasago (JP); Hideki Yutaka, Takasago (JP); Kazuhisa Fukutani, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 386 days.

(21) Appl. No.: 10/190,660

(22) Filed: Jul. 9, 2002

(65) Prior Publication Data

US 2003/0033835 A1 Feb. 20, 2003

(30) Foreign Application Priority Data

Aug. 16, 2001 (JP) ........................................ 2001-247204

(51) Int. Cl.[7] .............................................. C03B 37/029
(52) U.S. Cl. ..................... 65/537; 65/374.15; 219/541
(58) Field of Search .................... 65/488, 533, 507, 65/508, 509, 534, 374.15, 537; 219/541; 373/109, 134

(56) References Cited

U.S. PATENT DOCUMENTS

| | | | | |
|---|---|---|---|---|
| 3,359,077 A | * | 12/1967 | Arst | ............................ 117/30 |
| 4,174,842 A | * | 11/1979 | Partus | ......................... 277/431 |
| 4,279,952 A | * | 7/1981 | Kodama et al. | ............ 428/36.1 |
| 4,988,374 A | * | 1/1991 | Harding et al. | ............... 65/435 |

FOREIGN PATENT DOCUMENTS

| | | | | |
|---|---|---|---|---|
| EP | 0 752 393 A1 | 1/1997 | | |
| JP | 59-217641 | 12/1984 | | |
| JP | 63-182236 | 7/1988 | | |
| JP | 06235828 A | * | 8/1994 | ............ G02B/6/00 |
| JP | 7-109143 | 4/1995 | | |
| JP | 8-59277 | 3/1996 | | |
| JP | 9-2833 | 1/1997 | | |
| JP | 9-71433 | 3/1997 | | |

* cited by examiner

Primary Examiner—Steven P. Griffin
Assistant Examiner—Lisa L Herring
(74) Attorney, Agent, or Firm—Oblon, Spivak, McClelland, Maier & Neustadt, P.C.

(57) ABSTRACT

The present invention provides an optical fiber preform-heating furnace that is simple in its structure and excellent in uniformity of the temperature distribution in a circumferential direction of an optical fiber preform. The optical fiber preform-heating furnace includes a furnace core tube into which an optical fiber preform is supplied; a heater that surrounds the furnace core tube; a pair of electrode connection portions with which the heater is provided and has a face opposing to an outer periphery surface of the furnace core tube; and electrode portions that are disposed to each of the electrode connection portions and connected to a power supply. When a cylindrical heat insulator is disposed between the furnace core tube and the opposing faces, since an outward heat transfer amount from the furnace core tube side through the electrode portion can be reduced, the temperature distribution in a circumferential direction of the optical fiber preform can be improved in its uniformity.

9 Claims, 5 Drawing Sheets

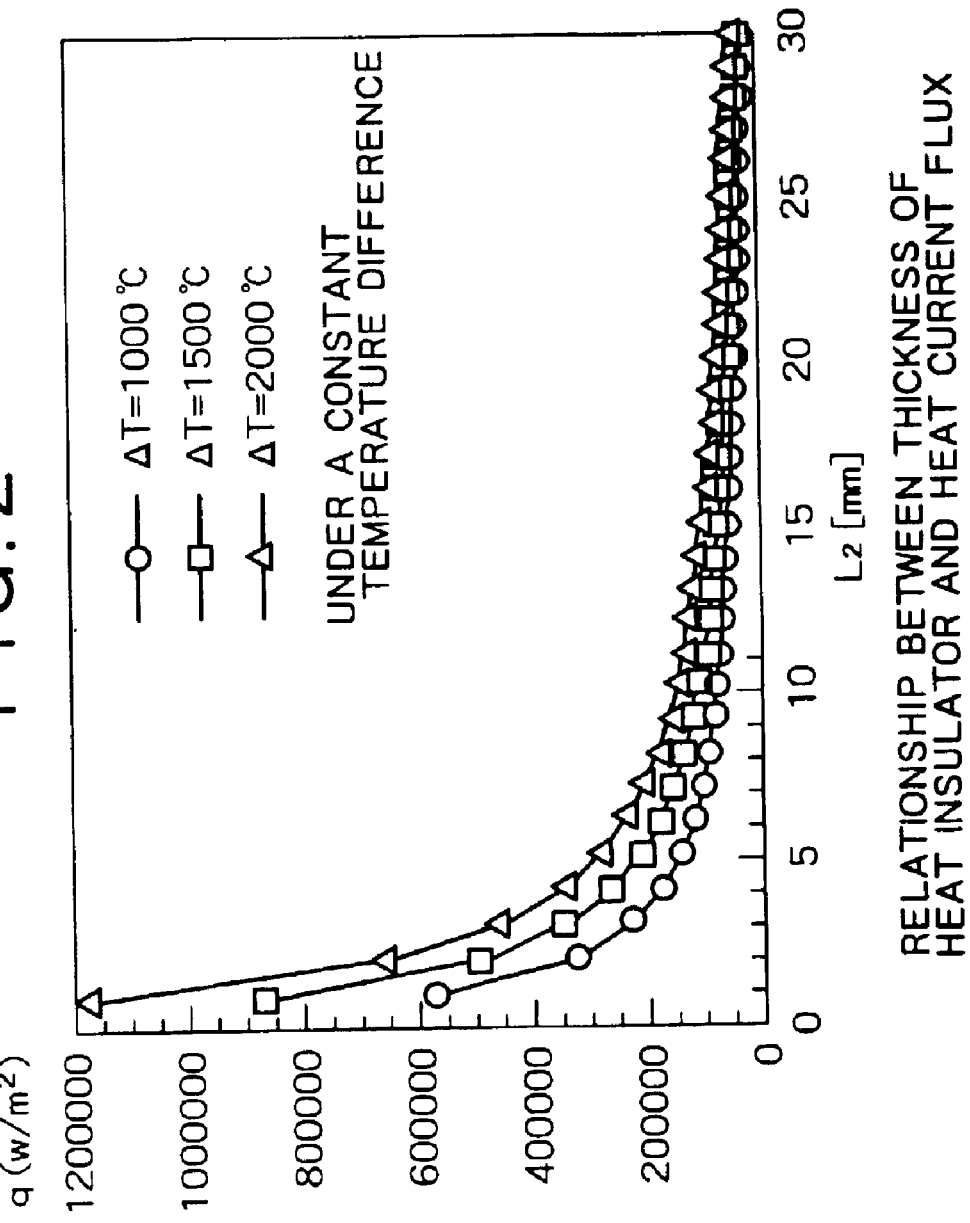

OPTICAL FIBER PREFORM-HEATING FURNACE

BACKGROUND OF THE INVENTION

1. Field of the Invention

The present invention relates to an apparatus and method for heating an optical fiber preform in the process of fabricating an optical fiber, such as, for instance, sintering a porous optical fiber preform, collapsing a circular tube, jacketing a quartz tube, or extending or drawing an optical fiber preform. When the aforementioned apparatus and method of the present invention are used for heating the optical fiber preform, the optical fiber preform can be sintered, collapsed, jacketed, or extended or drawn while maintaining a uniform temperature distribution over an entire circumference of the optical fiber preform. Thereby, the circularity of the obtained optical fiber preform or an optical fiber may be improved.

2. Description of the Related Art

An optical fiber is fabricated by melting and drawing an optical fiber preform by use of, for instance, an optical fiber preform-heating furnace. Such an optical fiber preform-heating furnace 51 is, as shown in a longitudinal cross sectional view of FIG. 3, configured generally in such that a furnace core tube 52 into which the optical fiber preform 57 is supplied from an upper end side thereof, a heater 53 that surrounds the furnace core tube 52 and has a pair of electrode portions 532 each of which is disposed at an upper side of the heater and faces to each other, and a heater-surrounding heat insulator 54 that surrounds the heater 53 are accommodated in a stainless body 55 that is structured in a water-cooling jacket.

When an optical fiber (a linear product) 58 is fabricated by use of a generally used optical fiber preform-heating furnace 51 according to the aforementioned conventional example 1, a voltage is applied to a pair of electrode portions 532 from a not shown power supply to heat the heater 53. While thereby heating and melting the optical fiber preform 57 that is supplied into the furnace core tube 52, the optical fiber 58 is drawn from a lower end side of the furnace core tube 52. This optical fiber preform-heating furnace 51 can be naturally used also for, for instance, sintering a porous preform, collapsing a circular tube, jacketing a quartz tube, and drawing an optical fiber preform.

As a parameter that shows how a cross section of the optical fiber, a linear product, deviates from a perfect circle, there is noncircularity (%) that is expressed by ((major axis−minor axis)/an average diameter)×100. When an optical fiber has the noncircularity that is near zero, it can be said excellent in quality. That is, as the noncircularity of the optical fiber deviates largely from a perfect circle, a diameter of a hole that is used for fitting the optical fiber and formed in a ferrule that is used to align an optical connector has to be made larger. Accordingly, an axis line of the hole and that of the optical fiber deviate largely, resulting in a larger optical connection loss of the optical fiber. Likewise, in the case of the optical fiber being pressed onto a V groove formed in an alignment block and these being connected together, when a radius of the optical fiber of a portion that comes into contact with the V groove fluctuates and deviates from a perfect circle, an axis misalignment at the time of connection and optical connection loss are caused. It is not preferable too.

In the case of the optical fiber preform-heating furnace 51 according to the aforementioned conventional example 1 that has a general configuration, a heat current escapes from the heater 53 through the pair of electrode portions 532. Thereby, low temperature portions are locally generated in the heater 53. As a result, the uniformity of the temperature distribution in a circumferential direction of the furnace core tube 52 becomes insufficient and only the optical fiber 58 that has the noncircularity of 1% or more can be drawn. That is, there is a problem in that the optical fiber 58 having a small noncircularity is difficult to fabricate.

An optical fiber drawing furnace by which a temperature distribution uniformity in a circumferential direction of a furnace core tube is attempted to improve has been proposed in, for instance, Japanese Unexamined Patent Application Publication No. HEI 9-71433. In the following, the optical fiber drawing furnace according to this conventional example 2 will be described with reference to FIG. 4 that is a plan sectional view thereof, FIG. 5a that is a perspective view showing an appearance of a heater thereof and FIG. 5b that is a perspective view showing an appearance of the other heater thereof with the same names and the same reference numerals as the same patent publication.

That is, the optical fiber drawing furnace according to the conventional example 2 is attempted to overcome a problem accompanying the optical fiber preform 15 due to the nonuniformity of the temperature distribution in a circumferential direction of the optical fiber preform 15 that is heated by the circular heater 18, the optical fiber, a linear product, cannot be drawn from the optical fiber drawing furnace with smaller noncircularity. More specifically, a furnace core tube 13 therein the optical fiber preform 15 is supplied; a heater 18 that is arranged outside of the furnace core tube 13 and, as shown in FIG. 5a or FIG. 5b, formed in the shape in which slits are alternately disposed from both ends of a cylindrical body; and electrode connection portions 22 through 25 that protrude outwardly from the heater 18 and connect through a plurality of electrode portions 29 and 30 to a power supply 33. In the aforementioned optical fiber drawing furnace, as a means for equalizing a temperature distribution in a circumferential direction of the aforementioned heater 18, the number of the electrode connection portions 22 to 25 is made so as to outnumber that of the electrode portions 29 and 30.

According to the optical fiber drawing furnace of the aforementioned conventional example 2, as mentioned above, in order to equalize the temperature distribution in a circumferential direction of the furnace core tube 13 (the temperature distribution in a circumferential direction of the optical fiber preform 15), an equalizing means is provided so that the number of the electrode connection portions 22 through 25 may outnumber that of the electrode portions 29 and 30.

This equalizing means is effective in equalizing the temperature distribution in a circumferential direction of the furnace core tube (the temperature distribution in a circumferential direction of the optical fiber preform) and allows fabricating an excellent quality optical fiber that has a sectional shape of which noncircularity is less than 0.2%, that is, of a near perfect circle. Accordingly, the optical fiber drawing furnace according to the conventional example 2 is superior to the optical fiber preform-heating furnace according to the conventional example 1 according to a general configuration.

However, in the case of the optical fiber drawing furnace according to the conventional example 2, since a structure from the heater to the electrodes portions become complicated, not only the optical fiber drawing furnace becomes high in cost but also it takes a longer time to disassemble, to inspect and cleanse, and to reassemble. Accordingly, there still remains a problem to be overcome in that this optical fiber drawing furnace is disadvantageous in capacity utilization as well as in running cost.

That is, in spite of the optical fiber preform-heating furnace is simple in its structure, and allows fabricating an optical fiber having the same noncircularity as that of the optical fiber drawing furnace according to the aforementioned conventional example 2 is desirable.

SUMMARY OF THE INVENTION

Accordingly, the object of the present invention is to provide an optical fiber preform-heating furnace that is simple in its structure and excellent in its uniformity of the temperature distribution in a circumferential direction of the optical fiber preform.

In order to overcome the aforementioned problems, the present invention was carried out. An optical fiber preform-heating furnace of the present invention comprises a heater that is disposed so as to surround an optical fiber preform that is supplied into the optical fiber preform-heating furnace; a plurality of electrode connection portions each of which is protruded from the aforementioned heater and has a face opposing to the aforementioned optical fiber preform; electrode portions that are connected to a power supply and each of which is disposed so as to connect with each of the aforementioned plurality of electrode connection portions; and a heat insulator that is disposed between the aforementioned optical fiber preform and the opposing face of the aforementioned electrode connection portions.

According to the aforementioned configuration, since due to the heat insulator, a heat transfer amount from the electrode portion may be reduced, the temperature distribution in a circumferential direction of the optical fiber preform may be more equalized. As a result, a linear product that is small in its noncircularity, that is, excellent in its circularity can be fabricated.

In the optical fiber preform-heating furnace of the present invention, it is preferable for the aforementioned electrode portions and the aforementioned electrode connection portions are formed so as to have the same number and for each of the electrode portions to be disposed to each of the aforementioned plurality of electrode connection portions. Furthermore, the number of the aforementioned electrode portions is preferable to be 2.

According to the aforementioned configuration, there is no need of the number of the electrode connection portions outnumbering that of the electrode portions and thereby attaining uniformity of the temperature distribution in a circumferential direction of the optical fiber preform. As a result, since the optical fiber preform-heating furnace can be structured simpler, it may be manufactured at lower costs. In addition, since it takes a shorter time to disassemble, to inspect and cleanse, and to reassemble, the present optical fiber preform-heating furnace becomes advantageous in capacity utilization as well as in running cost.

In addition, the optical fiber preform-heating furnace of the present invention may further comprise a furnace core tube into which the aforementioned optical fiber preform is supplied. In this case, the heater is disposed so as to surround the furnace core tube, and the heat insulator is disposed between the furnace core tube and the opposing face of the electrode connection portions.

Furthermore, in the optical fiber preform-heating furnace of the present invention, a distance between the opposing face of the aforementioned electrode connection portion and the optical fiber preform may be formed larger than that between the heater and the optical fiber preform.

Still furthermore, in the optical fiber preform-heating furnace of the present invention, the aforementioned electrode connection portions may be disposed so as to connect with the heater at upper ends thereof.

In the optical fiber preform-heating furnace of the present invention, the heat insulator may be any one of carbon fiber, carbon foil, or carbon molded body.

In the optical fiber preform-heating furnace of the present invention, an electric resistance value per unit length of the electrode connection portions may be preferably set in the range of 0.1 to 0.3 times that of a heat-generating portion of the aforementioned heater.

In the optical fiber preform-heating furnace of the present invention, a sectional area of the heat-generating portion in the neighborhood of connection portions with the aforementioned electrode connection portions of the heater may be preferably configured so as to be smaller than a sectional area of the other portion of the aforementioned heat-generating portion.

BRIEF DESCRIPTION OF THE DRAWINGS

FIG. 2 is a diagram that shows relationship between thickness of the heat insulator and heat current density in one embodiment of the present invention. In the diagram, horizontal axis shows thickness $L_2$ in (mm) and vertical axis shows heat current density q in $(W/m^2)$.

DESCRIPTION OF THE PREFERRED EMBODIMENTS

In the following, an optical fiber preform-heating furnace according to an embodiment of the present invention will be explained with sequential reference to FIG. 1a that is a diagram schematically showing the optical fiber preform-heating furnace with a longitudinal sectional view thereof, FIG. 1b that is a perspective view showing a heater including electrode connection portions and electrode portions, and FIG. 2 that is a diagram showing relationship between thickness of a heat insulator and heat current flux with horizontal axis showing thickness of the heat insulator in (mm) and vertical axis showing heat current density q in $(W/m^2)$.

Figure 1A:
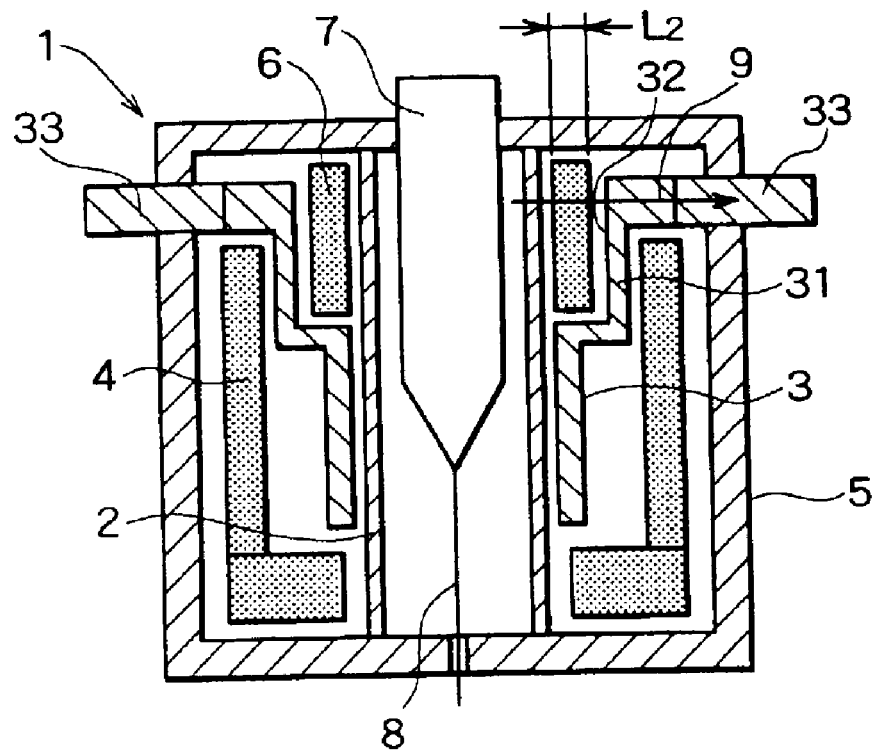
FIG. 1a is a diagram schematically showing a longitudinal cross sectional configuration of the optical fiber preform-heating furnace according to an embodiment of the present invention.

Reference numeral 1 in FIG. 1a denotes the optical fiber preform-heating furnace according to an embodiment of the present invention. The optical fiber preform-heating furnace 1 comprises a furnace core tube 2 into which an optical fiber preform 7 is supplied from a upper end side thereof, a heater 3 that surrounds a substantial center portion in a vertical direction of the furnace core tube 2, a pair of electrode connection portions 31 that is disposed so as to oppose to each other at top end portions of the heater 3, has faces 32 opposing to an outer periphery surface of the aforementioned furnace core tube 2, and has a distance between the opposing faces larger than an inner diameter of the heater 3, electrode portions 33 that project in opposite directions at tops of the pair of electrode connection portions 31, a heater surrounding heat insulator 4 that surrounds the aforementioned heater 3 and a lower side portion of the electrode connection portions 31, and a stainless body 5 that is formed in a water-cooling jacket structure and accommodates the heater surrounding heat insulator 4. Tip ends of the aforementioned electrode portions 33 are configured so as to penetrate through an outer wall of the body 5 and protrude outward. The heater 3 and the electrode connection portions 33 will be described later.

The optical fiber preform-heating furnace 1 in the present embodiment is, as shown in the above, provided with the furnace core tube 2 inside of the heater 3. However, since there are optical fiber preform-heating furnaces that are not provided with such a furnace core tube, the present invention is not restricted to the optical fiber preform-heating furnace that is provided with the furnace core tube 2.

Figure 1B:
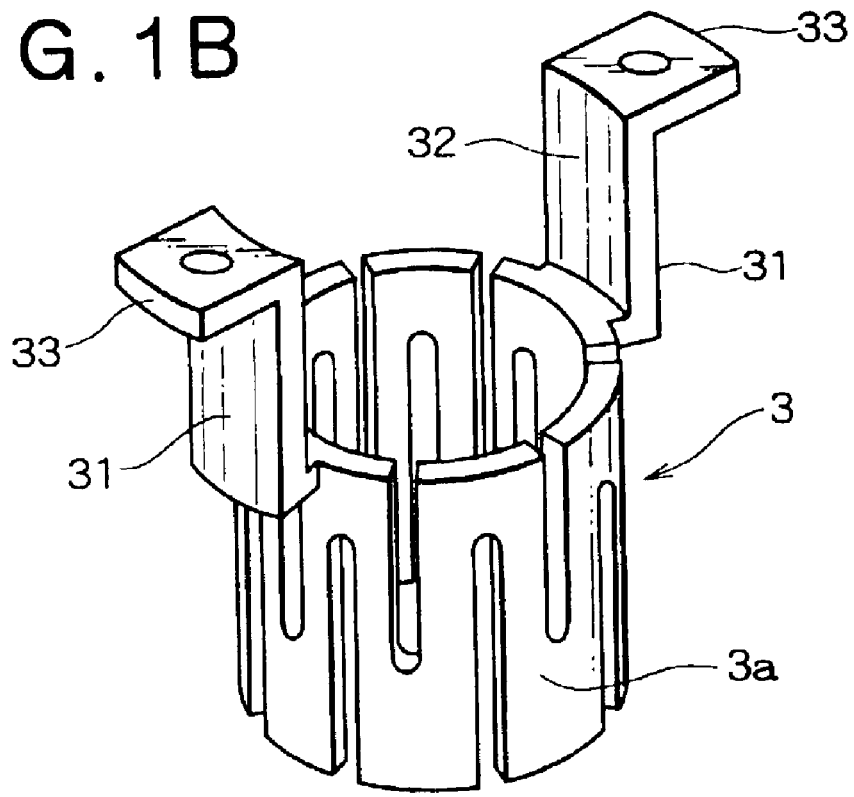
FIG. 1b is a perspective view of the heater including electrode connection portions and electrode portions according to the same.
Figure 3:
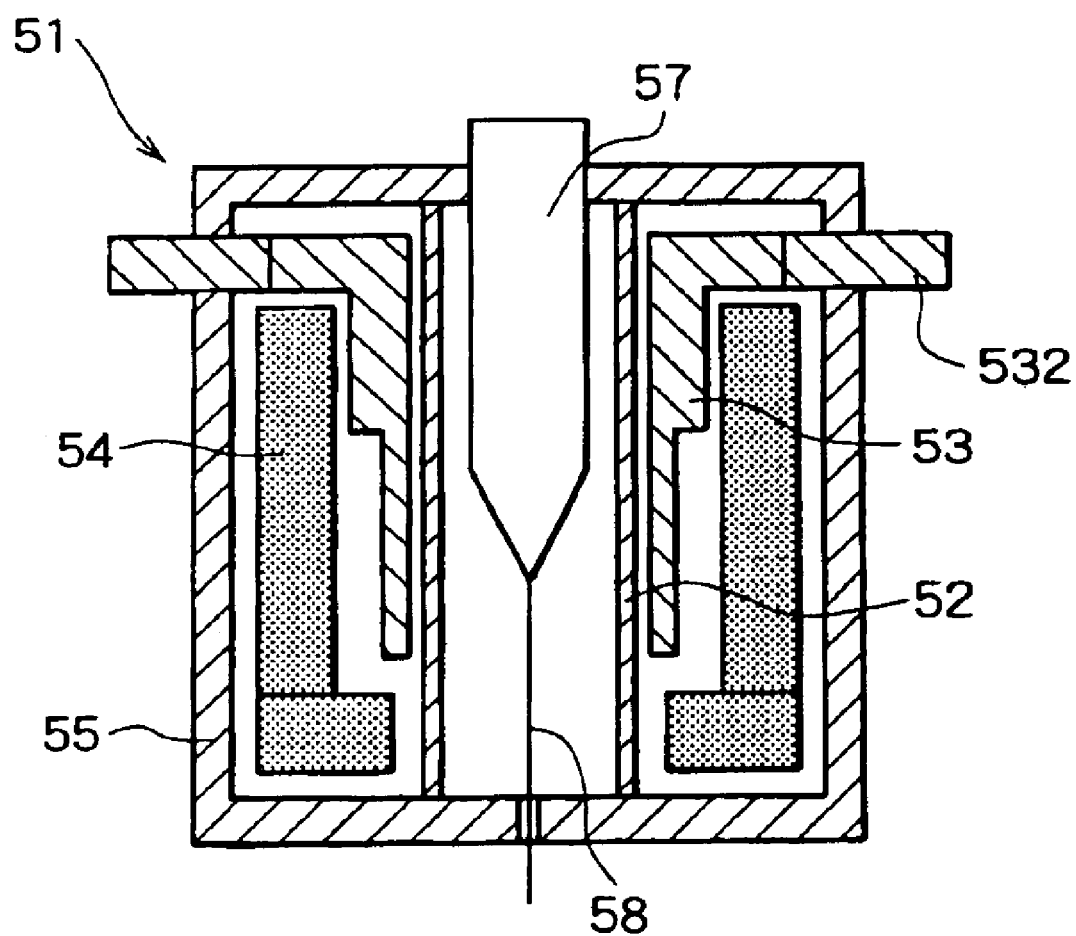
FIG. 3 is a diagram showing a longitudinal sectional configuration of the optical fiber preform-heating furnace according to the conventional example 1.
Figure 4:
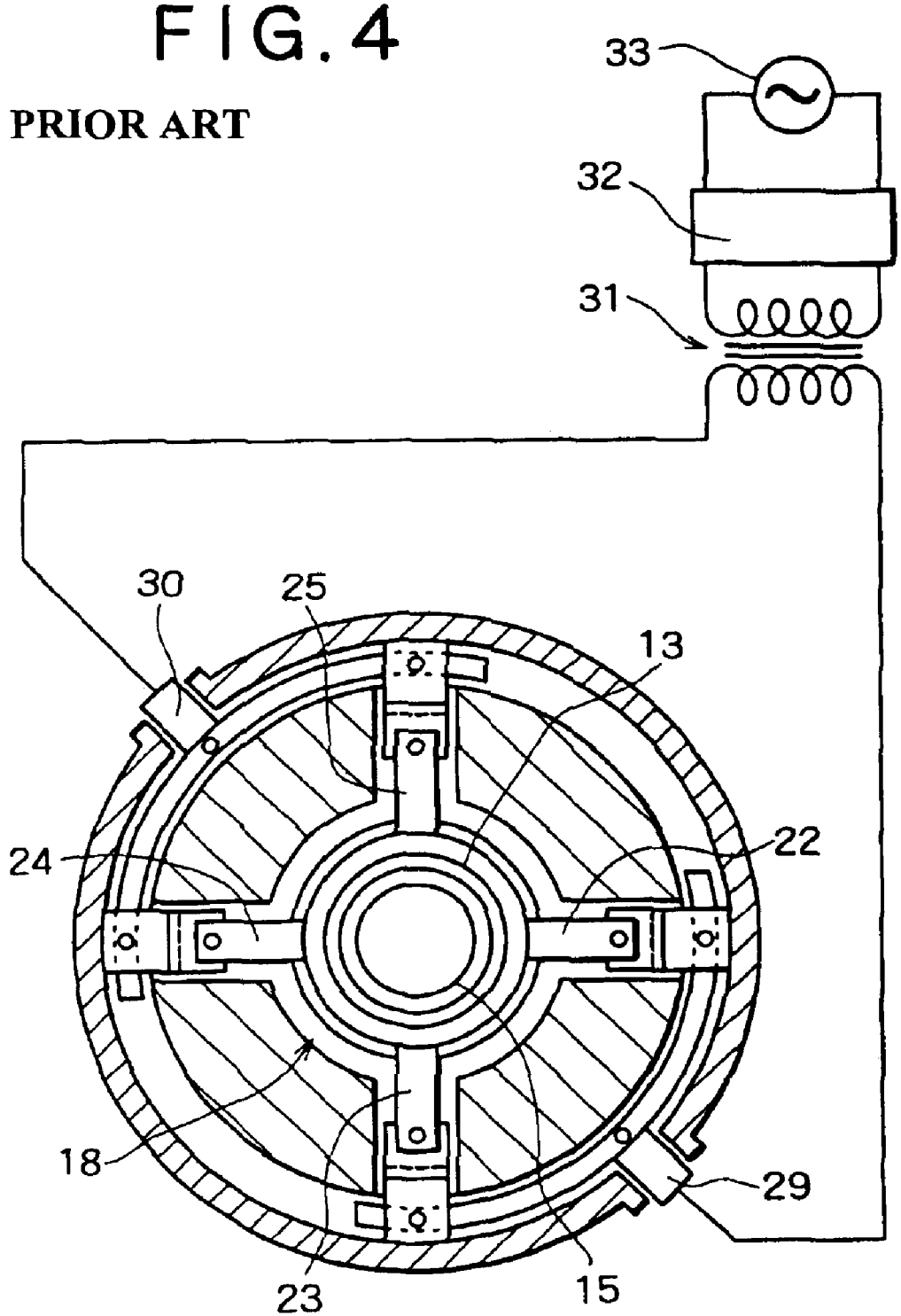
FIG. 4 is a plan sectional view of an optical fiber drawing furnace according to the conventional example 2.
Figure 5A:
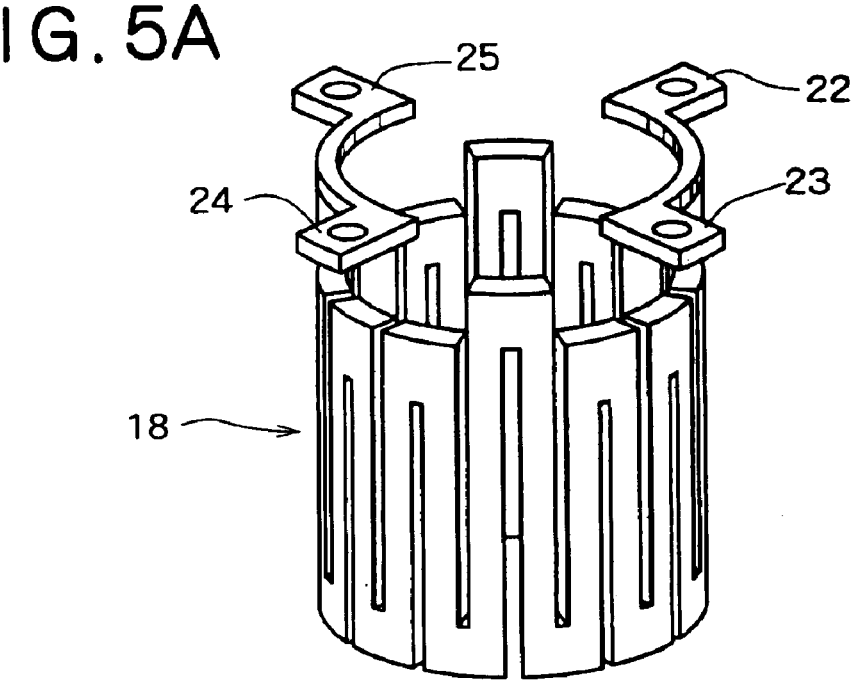
FIG. 5A is a perspective view showing appearance of the heater of the optical fiber drawing furnace according to the conventional example 2.
Figure 5B:
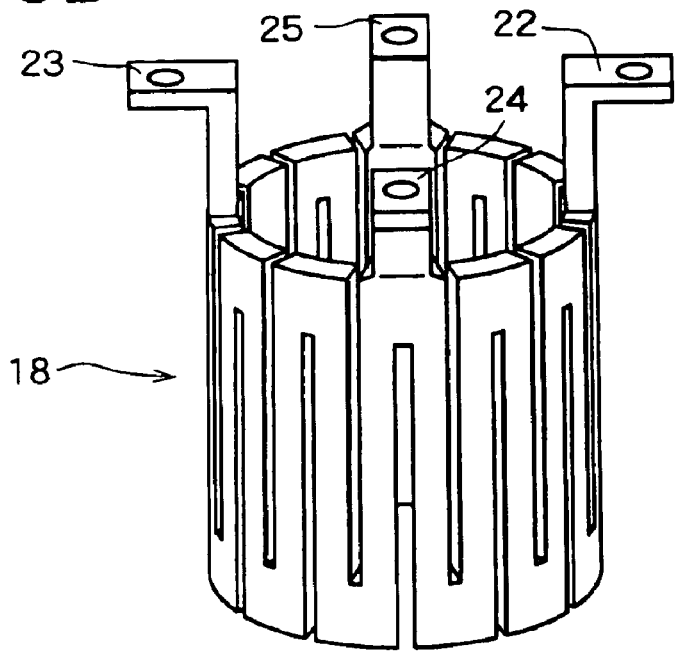
FIG. 5b is a perspective view showing appearance of the other heater of the optical fiber drawing furnace according to the same.

The aforementioned heater 3 is formed in a structure in which, as shown in FIG. 1b, a plurality of pieces of heat-generating portion 3a is formed between slits that are disposed alternately from both ends of a cylindrical body. An electric resistance value per unit length of the electrode connection portion 31 is set so as to be in the range of 0.1 to 0.3 times an electric resistance value per unit length per one piece of the aforementioned heat-generating portion 3a. The reason for setting the electric resistance value per unit length of the electrode connection portions 31 in the range of 0.1 to 0.3 times the electric resistance value per unit length per one piece of the aforementioned heat-generating portion 3a is as follows. When the electric resistance value per unit length of the aforementioned electrode connection portions 31 is set at 0.3 times or more, the electric resistance value thereof may became larger due to a smaller cross sectional area, resulting in an inconvenience in that heat load becomes too large. By contrast, when the electric resistance value per unit length of the aforementioned electrode connection portions 31 is set at 0.1 times or less, the heat current flux may become larger due to a larger cross sectional area, resulting in an inconvenience in that temperature lowering of the electrode connection portions 31 adversely affects on the heat-generating portions 3a.

In addition, in order to make a heat generation amount of the heat-generating portion in the neighborhood of a connection portion larger than that of the other heat-generating portion of the heater 3, a cross sectional area of the heat-generating portion in the neighborhood of the connection portion with the electrode, connection portion 31 of the aforementioned heater 3 is set so as to be smaller than that of the other heat-generating portion of the heater 3. Thereby, the temperature lowering in the neighborhood of the connection portion due to heat transfer to the electrode connection portion 31 may be reduced. As a result, the temperature distribution in a circumferential direction at the upper end portion of the heater 3 may be more equalized.

Inside of each of the aforementioned pair of electrode connection portions 31, there is formed a connection portion cooling chamber (not shown in the figure) from or into which cooling water flows. By flowing cooling water in or out of the connection portion-cooling chamber, the electrode connection portions 31 and electrode portions 33 may be inhibited from melting. Furthermore, a heat insulating cylinder 6 that is made of a heat insulator, that is, any one material of carbon fiber, carbon foil, or carbon molded body is disposed between an outer periphery surface of the furnace core tube 2 and the opposing faces 32 of the electrode connection portions 31.

A thickness $L_2$ (m) of the aforementioned heat-insulating cylinder 6 is determined by use of a relational expression between a heat current density q in an outward arrow direction in FIG. 1, the thickness $L_2$ of the heat-insulating cylinder 6, and a temperature difference $\Delta T$ between an inner surface of the heat-insulating cylinder 6 that faces a position that connects the electrode portion 33 to the electrode connection portion 31 and an outer surface of the electrode portion 33. The heat current density q is calculated for each of the cases where the temperature difference $\Delta T$ is 1000° C., 1500° C., and 2000° C. From these calculations of the heat current densities q, the thickness $L_2$ of the heat-insulating cylinder 6 is determined. The aforementioned heat current density q expresses a heat transfer amount from the electrode portion 33.

$$q = \Delta T/(L_1/\lambda_1 + L_2/\lambda_2) = \Delta T/(0.05/115 + L_2/0.8)$$

In the aforementioned relational expression, $L_1$ (m) is a length of the electrode portion 33, $\lambda_1$[(W/m·K)] the thermal conductivity of the electrode portion 33, and $\lambda_2$[(W/m·K)] the thermal conductivity of the heat insulating cylinder 6.

The relationship between the thickness $L_2$ in terms of mm of the heat insulating cylinder 6 and the heat current density q (W/m$^2$) obtained from the aforementioned relational expression is as shown in FIG. 2. That is, according to the FIG. 2, it is found that in all cases where the temperature differences $\Delta T$ are 1000° C. (shown by white round mark), 1500° C. (shown by white square), and 2000° C. (shown by white triangle), the heat current density q becomes remarkably small when the thickness $L_2$ of the heat insulating cylinder 6 becomes substantially 5 mm, and when the thickness $L_2$ of the heat insulating cylinder 6 becomes substantially 10 mm the heat current density q can be suppressed relatively low. In addition, when the thickness $L_2$ of the heat-insulating cylinder 6 exceeds 10 mm, a further increase in the thickness $L_2$ of the heat-insulating cylinder 6 results in only a slight decrease in the heat current density q.

Accordingly, it is considered that when the thickness $L_2$ of the heat insulating cylinder 6 is set at 10 mm, even when the electrode connection portions 31 and the electrode portions 33 are cooled by flowing cooling water in or out of the connection portion cooling chamber, the non-uniformity of the temperature distribution in a circumferential direction of the furnace core tube 2 (the temperature distribution in a circumferential direction of the optical fiber preform 7) may be effectively cancelled. According to this consideration, an optical fiber preform heating furnace 1 having a heat-insulating cylinder 6 whose thickness $L_2$ is 10 mm is prepared.

EMBODIMENTS

The optical fiber preform 7 is supplied into the furnace core tube 2 of the optical fiber preform-heating furnace 1 that is configured as shown above, and while water cooling each of the pair of electrode connection portions 31 electricity is supplied from a not shown power supply through the electrodes 33 and the electrode connection portions 31 to the heater 3. Thereby, the furnace core tube 2 is heated to 2100° C. (that is measured by use of a radiation thermometer), and an optical fiber (a linear product) 8 is fabricated by drawing at a speed of 1200 m/min. When the noncircularity is measured of thus fabricated optical fiber 8, it is found to be 0.4% or less. That is, a user demand for lowering an axis misalignment and optical connection loss at the connection may be sufficiently satisfied. The axis misalignment and optical connection loss at the connection are caused when an axis line of a hole for fitting an optical fiber that is formed in a ferrule for use in alignment of an optical connector and an axis line of the optical fiber deviate from each other.

Like this embodiment, by only inserting the heat insulating cylinder 6 between an outer periphery surface of the furnace core tube 2 and the opposing faces 32 of the electrode connection portions 31, an optical fiber 8 that has excellent circularity, that is, the noncircularity of 0.4% or less can be fabricated. This shows that there is no need of, as in the optical fiber drawing furnace according to the aforementioned conventional example 2, the number of the electrode connection portions outnumbering that of the electrode portions to equalize the temperature distribution in a circumferential direction of the furnace core tube 2 (the temperature distribution in a circumferential direction of the optical fiber preform). In other words, this embodiment indicates that the number of the electrode portions 33 can be made less than that of the electrode portions of the optical fiber drawing furnace according to the conventional example 2.

As mentioned above, according to the optical fiber preform-heating furnace 1 according to the present embodiment, even if the electrode portions 33 is one pair, due to the heat-insulating cylinder 6, an outward heat transfer amount from the electrode portions 33 can be reduced, and the temperature distribution in a circumferential direction of the furnace core tube 2 (the temperature distribution in a circumferential direction of the optical fiber preform 7) can be more equalized. Accordingly, the optical fiber 8 that has substantially the same excellent circularity as in the case of the optical fiber drawing furnace according to the conventional example 2 can be fabricated.

In the case of the optical fiber preform-heating furnace 1 according to the present embodiment, unlike the optical fiber drawing furnace according to the conventional example 2 in which the number of the electrode connection portions is made larger than that of the electrode portions to equalize the temperature distribution in a circumferential direction of the furnace core tube (the temperature distribution in a circumferential direction of the optical fiber preform), the heater 3 is provided with only a pair of electrode portions 32. Accordingly, in comparison with the optical fiber drawing furnace according to the conventional example 2 in which the number of electrode portions outnumbers that of the electrode portions, the optical fiber preform-heating furnace 1 is simple in its structure. As a result, the optical fiber preform-heating furnace 1 can be made at lower costs as well as disassembled, inspected and cleansed, and reassembled in a shorter time. Accordingly, the optical fiber preform-heating furnace 1 has an excellent effect over the optical fiber drawing furnace according to the conventional example 2 in that the capacity utilization and running cost are advantageous.

In the above, a case where the heater 3 is provided with a pair of electrode portions 33 is explained as an example. However, when the technical idea according to the optical fiber-preform heating furnace of the present invention is applied to, for instance, the optical fiber drawing furnace according to the conventional example 2, it may be supposed to contribute in realizing further uniformity in the temperature distribution in a circumferential direction of the furnace core tube (the temperature distribution in a circumferential direction of the optical fiber preform). Accordingly, the applicable range of the technical idea of the present invention is not restricted to the aforementioned embodiment.

What is claimed is:

1. An optical fiber preform-heating furnace, comprising:
   a heater that is disposed so as to surround an optical fiber preform that is supplied in said optical fiber-heating furnace;
   a plurality of electrode connection portions, each of said plurality of electrode connection portions being protruded from the heater and having a face opposing to the optical fiber preform;
   electrode portions that are connected to a power supply, said electrode portions being arranged so as to connect with each of said plurality of electrode connection portions; and
   a heat insulator that is disposed between the optical fiber preform and the opposing faces of said electrode connection portions.

2. The optical fiber preform-heating furnace as set forth in claim 1, wherein the number of said electrode portions and that of said electrode connection portions are the same and each of said electrode portions is arranged to each of said plurality of the electrode connection portions.

3. The optical fiber preform-heating furnace as set forth in claim 2, wherein the number of said electrode portions is two.

4. The optical fiber preform-heating furnace as set forth in claim 1, further comprising a furnace core tube into which the optical fiber preform is supplied, wherein said heater is disposed so as to surround said furnace core tube and said heat insulator is disposed between said furnace core tube and the opposing faces of said electrode connection portions.

5. The optical fiber preform-heating furnace as set forth in claim 1, wherein a distance between the opposing face of said electrode connection portion and the optical fiber preform is larger than that between said heater and the optical fiber preform.

6. The optical fiber preform-heating furnace as set forth in claim 1, wherein said electrode connection portions arc disposed so as to connect with said heater at the upper end thereof.

7. The optical fiber preform-heating furnace as set forth in claim 1, wherein said heat insulator is any one of carbon fiber, carbon foil, or carbon molded body.

8. The optical fiber preform-heating furnace as set forth in claim 1, wherein an electric resistance value per unit length of said electrode connection portion is set in the range of 0.1 to 0.3 times an electric resistance value per unit length of a heat-generating portion of said heater.

9. The optical fiber preform-heating furnace as set forth in claim 1, wherein a cross sectional area of a heat-generating portion in the neighborhood of a connection portion with said electrode connection portion of said heater is configured so as to be smaller than a cross sectional area of the other portion of the heat-generating portion.

* * * * *

UNITED STATES PATENT AND TRADEMARK OFFICE
CERTIFICATE OF CORRECTION

PATENT NO. : 6,941,774 B2
DATED : September 13, 2005
INVENTOR(S) : Wakazono et al.

It is certified that error appears in the above-identified patent and that said Letters Patent is hereby corrected as shown below:

<u>Title page,</u>
Item [12], should read:
-- [12] United States Patent
      Wakazono et al. --.
Item [75], should read:
-- [75] Inventors: Takehiko Wakazono, Takasago (JP);
      Hideki Yutaka, Takasago (JP);
      Kazuhisa Fukutani, Kobe (JP) --.
Item [73], should read:
-- [73] Assignee: Kabushiki Kaisha Kobe Seiko Sho
      (Kobe Steel, Ltd.) Kobe (JP) --.

Signed and Sealed this

Eighth Day of November, 2005

JON W. DUDAS
*Director of the United States Patent and Trademark Office*